United States Patent
La Rosa et al.

(10) Patent No.: US 10,666,039 B2
(45) Date of Patent: May 26, 2020

(54) ELECTRONIC FUSE CIRCUIT, CORRESPONDING DEVICE AND METHOD

(71) Applicant: STMicroelectronics S.r.l., Agrate Brianza (IT)

(72) Inventors: Manuela La Rosa, Gravina di Catania (IT); Giovanni Sicurella, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 322 days.

(21) Appl. No.: 15/452,944

(22) Filed: Mar. 8, 2017

(65) Prior Publication Data

US 2018/0062376 A1    Mar. 1, 2018

(30) Foreign Application Priority Data

Aug. 30, 2016   (IT) ..................... 102016000088220

(51) Int. Cl.
| | |
|---|---|
| *H02H 3/20* | (2006.01) |
| *H02H 3/02* | (2006.01) |
| *H02H 1/00* | (2006.01) |
| *H02H 9/04* | (2006.01) |
| *H02H 3/38* | (2006.01) |
| *H02H 9/00* | (2006.01) |
| *H02H 9/02* | (2006.01) |

(52) U.S. Cl.
CPC ............ *H02H 3/20* (2013.01); *H02H 1/0007* (2013.01); *H02H 3/021* (2013.01); *H02H 3/38* (2013.01); *H02H 9/001* (2013.01); *H02H 9/02* (2013.01); *H02H 9/041* (2013.01); *H02H 9/043* (2013.01)

(58) Field of Classification Search
CPC ........ H02H 3/20; H02H 3/021; H02H 1/0007; H02H 3/38; H02H 9/001; H02H 9/02; H02H 9/041; H02H 9/043
USPC .......................................................... 361/86
See application file for complete search history.

(56) References Cited

U.S. PATENT DOCUMENTS

| | | | | |
|---|---|---|---|---|
| 5,039,934 | A * | 8/1991 | Banaska ................ | G05F 1/571 |
| | | | | 323/268 |
| 5,963,439 | A * | 10/1999 | Wuidart ................... | H02J 1/10 |
| | | | | 361/111 |
| 8,098,089 | B2 * | 1/2012 | Bitonti .................... | H02M 3/07 |
| | | | | 327/534 |
| 9,973,085 | B2 * | 5/2018 | Vicquery ................ | H02M 1/08 |

(Continued)

OTHER PUBLICATIONS

STEF12 Datasheet, STMicroelectronics, Jan. 2013, pp. 1-20.
IT Search Report and Written Opinion for IT Appl. No. 201600088220 dated Jul. 19, 2017 (6 pages).

*Primary Examiner* — Dharti H Patel
(74) *Attorney, Agent, or Firm* — Crowe & Dunlevy (57) ABSTRACT

A power stage in an electronic fuse circuit is driven by controller. The controller includes a first comparator set for output voltage control and a second comparator set for output current control. Each comparator set includes at least one comparator having a reference input, a feedback input, and one or more outputs. A driver circuit includes output terminals for driving the power stage. The driver circuit includes a switch that is selectively activated in response to outputs from the first and second comparator sets to clamp the voltage across the output terminals of the driver circuit. The clamp operation is made in response to feedback input to either of the first and second comparator sets having exceeded a certain reference.

19 Claims, 4 Drawing Sheets

(56) References Cited

U.S. PATENT DOCUMENTS

| | | | |
|---|---|---|---|
| 2004/0145843 A1* | 7/2004 | Winick | H02J 1/102 |
| | | | 361/90 |
| 2004/0252432 A1* | 12/2004 | Sasaki | B60K 6/485 |
| | | | 361/91.1 |
| 2008/0258691 A1* | 10/2008 | Lai | H02J 7/0031 |
| | | | 320/164 |
| 2011/0110009 A1* | 5/2011 | Sugimoto | H03K 17/0822 |
| | | | 361/93.1 |
| 2012/0063045 A1* | 3/2012 | Shearon | H02H 1/04 |
| | | | 361/65 |
| 2012/0069481 A1* | 3/2012 | Yamada | H02H 7/18 |
| | | | 361/93.7 |
| 2013/0286525 A1* | 10/2013 | Kanamori | H02H 9/004 |
| | | | 361/101 |
| 2015/0016005 A1* | 1/2015 | Simonson | H02H 9/025 |
| | | | 361/93.9 |
| 2016/0109212 A1 | 4/2016 | Bader et al. | |
| 2016/0172844 A1 | 6/2016 | van Dijk | |

* cited by examiner

ELECTRONIC FUSE CIRCUIT, CORRESPONDING DEVICE AND METHOD

PRIORITY CLAIM

This application claims the priority benefit of Italian Application for Patent No. 102016000088220, filed on Aug. 30, 2016, the disclosure of which is hereby incorporated by reference in its entirety.

TECHNICAL FIELD

The description relates to electronic fuse (e-fuse) circuits. One or more embodiments may be applied in integrated electronic fuse arrangements, for example, for monitoring output currents and/or input voltages of various electronic devices e.g. for the protection of power lines in data storage (HDD or SSD) devices and network servers.

BACKGROUND

An e-fuse circuit is a "universal" (integrated) electronic fuse used in monitoring output currents and/or input voltages, for example, over DC power lines.

For instance, when connected in series to a main power rail, an e-fuse detects and reacts to over-current and over-voltage conditions.

When an overload condition occurs, an e-fuse limits an output current to a safe value defined by the user. If an anomalous overload condition persists, an e-fuse transitions to an open state, for example, disconnecting a load from a power supply.

There is a need in the art further improve the configuration and operation of e-fuse circuits.

SUMMARY

One or more embodiments relate to a device and/or a method.

One or more embodiments provide a circuit architecture which controls an e-fuse circuit based on a switching approach, in the place of a linear control.

One or more embodiments involve switching control performed by few comparators, which are smaller in area than an operational amplifier, used to regulate an output voltage and current.

One or more embodiments permit savings in silicon area and simplify the driver circuit of, for example, a power MOS transistor in an associated output stage.

One or more embodiments provide an e-fuse architecture based on a non-linear control in the case of voltage clamp and current limitation conditions. Such an architecture includes comparators capable of detecting control conditions and actuating a power MOS transistor gate.

One or more embodiments offer one or more of the following advantages:
  area reduction
  easy re-use of control blocks
  enhanced control speed
  reduced power MOS stress condition.

BRIEF DESCRIPTION OF THE DRAWINGS

One or more embodiments will now be described, by way of example only, with reference to the annexed figures, wherein.

DETAILED DESCRIPTION

In the ensuing description, one or more specific details are illustrated, aimed at providing an in-depth understanding of examples of embodiments of the instant description. The embodiments may be obtained by one or more of the specific details or with other methods, components, materials, and so on. In other cases, known structures, materials or operations are not illustrated or described in detail so that certain aspects of embodiment will not be obscured.

Reference to "an embodiment" or "one embodiment" in the framework of the present description is intended to indicate a particular configuration, structure, characteristic described in relation to the embodiment is compliance in at least one embodiment. Hence, phrases such as "in an embodiment" or "in one (or more) embodiments" that may be present in one or more points in the present description do not necessarily refer to one and the same embodiment. Moreover, particular conformation, structures or characteristics as exemplified in connection with any of the figures may be combined in any other quite way in one or more embodiments as possibly exemplified in other figures.

The references used herein are provided merely for convenience and hence do not define the extent of protection or the scope of the embodiments.

Figure 1:
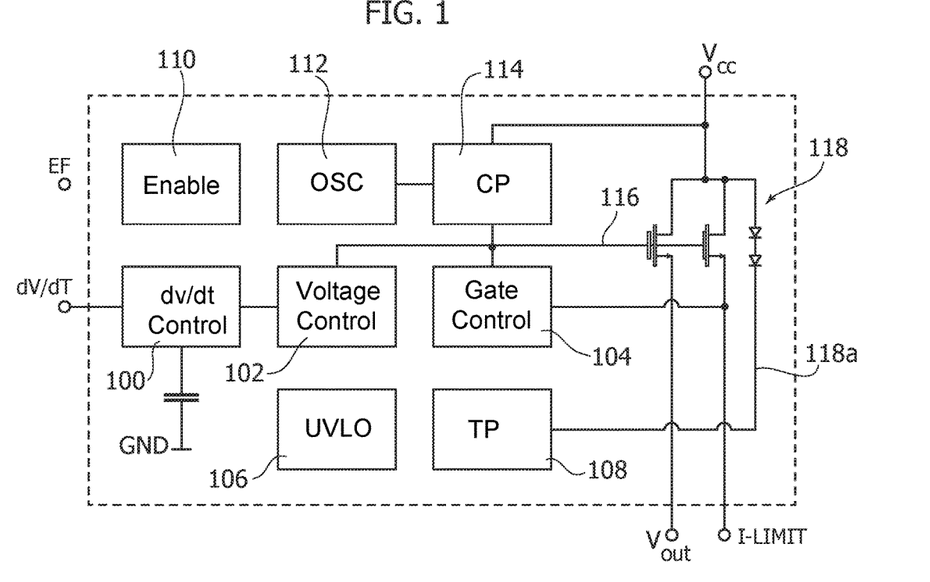
FIG. 1 is a block diagram of an e-fuse device.

FIG. 1 is a block diagram of an e-fuse device, where the blocks shown are as follows:
  100: dV/dt control circuit, e.g. capacitively coupled to ground;
  102: (linear) voltage control circuit;
  104: (linear) gate current control circuit;
  106: UnderVoltage Lock Out (UVLO) circuit;
  108: thermal protection (TP) circuit;
  110: enable circuit, controlled by an enable fault input EF;
  112: oscillator (OSC) circuit;
  114: charge pump (CP) circuit;
  116: power stage gate terminal connection;
  118: power stage circuit (e.g., power MOS transistors) providing controlled outputs voltage $V_{OUT}$ (voltage) from a source $V_{CC}$, a current feedback signal I-LIMIT and a connection line 118a to the thermal protection block 108.

A commercially available e-fuse product is known to those skilled in the art as the STEF12 Electronic Fuse as described in a corresponding datasheet (incorporated by reference). Such as circuit is exemplary of the arrangement of FIG. 1.

In an e-fuse device as shown in FIG. 1, the voltage control and current control circuit blocks 102, 104 include linear systems using operational amplifiers.

Such a device may be fully programmable: for instance the UVLO level, the overvoltage clamp level and the startup time can be set by means of external components. The internal dV/dt control circuit 100 controls the slew rate of the output voltage at turn-on. The device can provide a gate driver pin that can be used to turn-off an external power MOS transistor, for example, by implementing a reverse current blocking circuit. The intervention of the thermal protection block 108 signals, for example, the board monitoring circuits, through an corresponding signal on a Fault pin.

One or more embodiments provide a control scheme for an electronic fuse (e-fuse) circuit involving a comparison with hysteresis of output feedback voltage and current signals.

Figure 2:
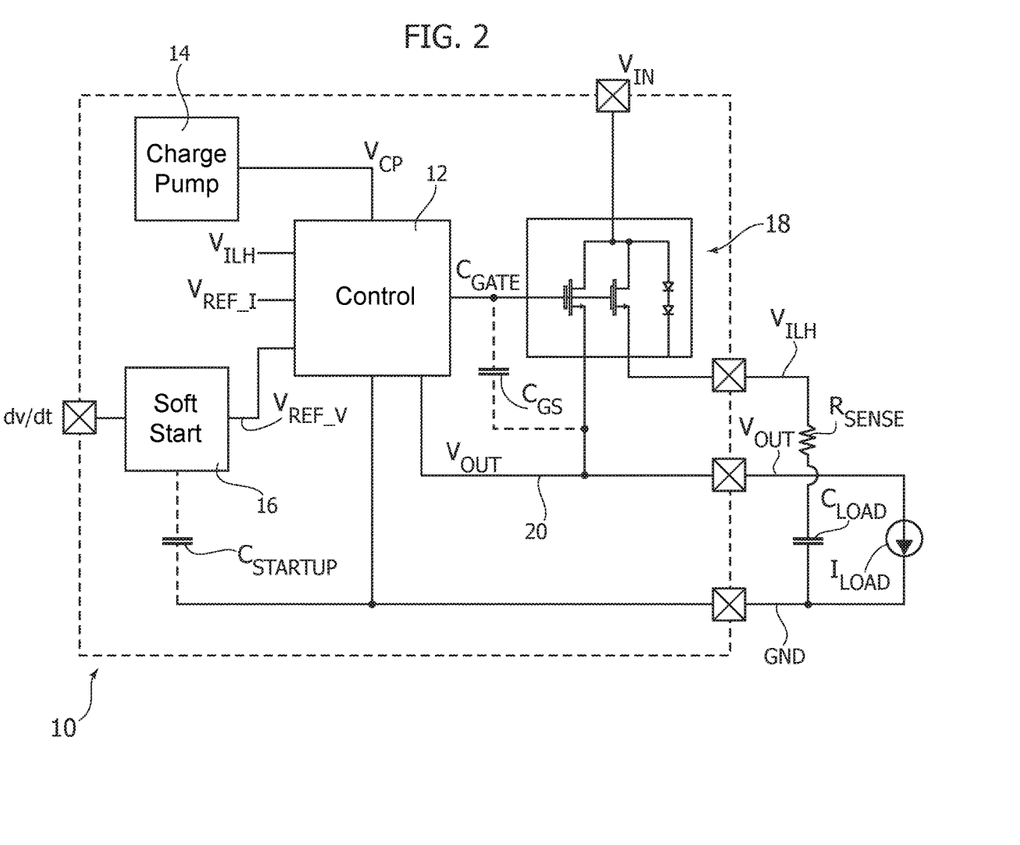
FIG. 2 is a block diagram of embodiments.

A basic layout of an e-fuse circuit 10 is shown in FIG. 2.

In one or more embodiments, the circuit 10 includes a controller circuit block 12 configured to implement a control strategy, which in contrast to the linear control of current e-fuse devices such as that shown in FIG. 1 involves voltage clamp and current limiting modules where operational amplifiers are replaced by comparators.

In one or more embodiments, the controller circuit 12 is coupled with a charge pump 14 circuit (signal CP) and an (optional) soft start up circuit module 16 (input signal dv/dt), which provides a (voltage) reference signal $V_{REF\_V}$ to the controller circuit 12. The soft start up circuit module 16 is capacitively ($C_{STARTUP}$) coupled to ground via a ground terminal GND.

In one or more embodiments, the controller circuit 12 generates a drive signal, for example, $V_{GATE}$ to a power stage (e.g., power MOS transistors) 18, which is coupled with a power supply voltage $V_{IN}$ to provide the output voltage $V_{OUT}$.

In one or more embodiments, the circuit 10 provides the controlled output voltage $V_{OUT}$ and the output current feedback signal $V_{ILH}$ at respective terminals indicated with corresponding designations in the figures.

In one or more embodiments, the controller circuit 12 regulates the $V_{GATE}$ signal, which drives the power stage 18, by charging and discharging the parasitic gate-source capacitance $C_{GS}$ of the power MOS transistor(s) in the power stage 18.

FIG. 2 also shows an external sense resistor $R_{SENSE}$ coupled across the terminals $V_{OUT}$ and $V_{ILH}$ which permits a user to set a limit value for the output current. Moreover, a capacitor $C_{LOAD}$ is assumed to be coupled with the load, here generically represented as a current line $I_{LOAD}$. These last cited elements can be assumed to be distinct from the embodiments.

The exemplary representation of FIG. 2 shows the input $V_{ILH}$ for providing to the controller circuit 12 feedback on output current from the homologous output terminal as well an input $V_{REF\_I}$ to the controller circuit 12. Moreover the exemplary representation of FIG. 2 shows the $V_{OUT}$ signal and the relative $V_{REF\_V}$ reference provided from the soft startup circuit block 16 that will be explained in the following.

Figure 3A:
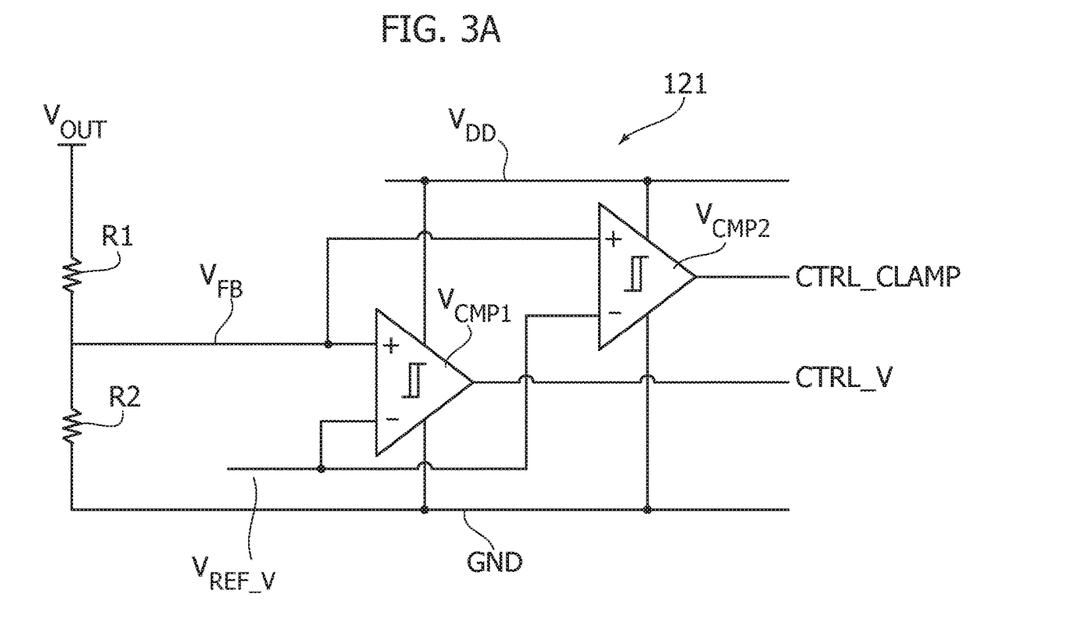
FIGS. 3A and 3B, are exemplary of comparators which are included in embodiments.
Figure 3B:
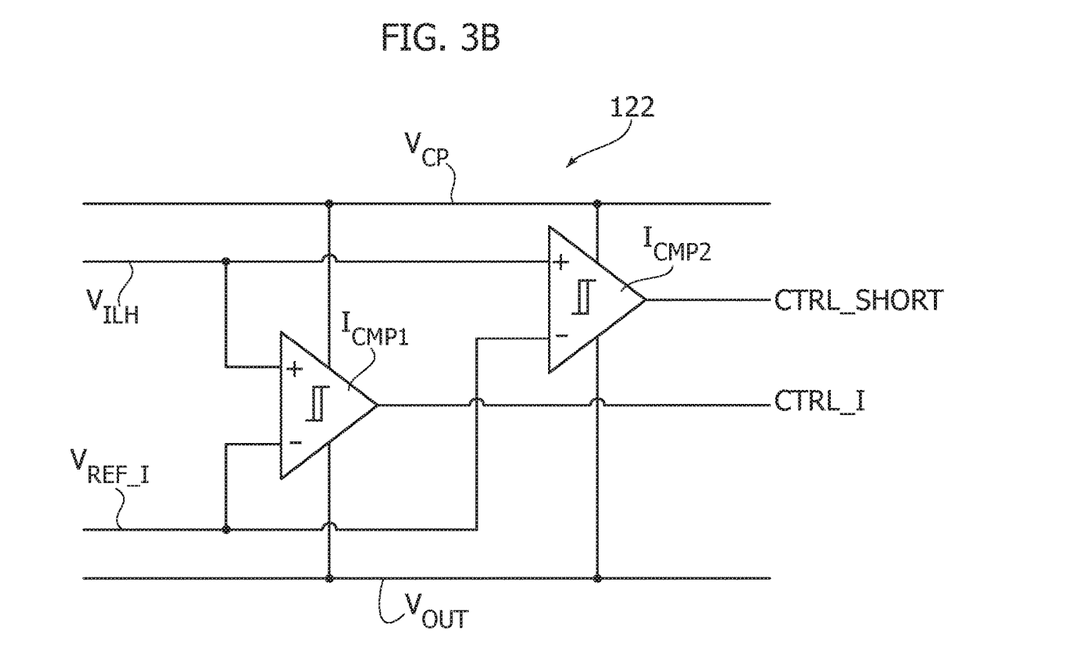

In one or more embodiments, the controller circuit 12 includes four comparators, for example:
 a first set 121 of two output voltage comparators VCMP1 and VCMP2; see FIG. 3A,
 a second set 122 two output current comparators ICMP1 and ICMP2; see FIG. 3B.

In one or more embodiments, these comparators produce four digital output control signals CTRL_CLAMP, CTRL_V, CTRL_SHORT, CTRL_I, which are processed as discussed in the following in connection with FIG. 5 in order to actuate the gate drive control function of the power block 18 in order to facilitate obtaining both a fast control of the output voltage/current (CTRL_CLAMP, CTRL_SHORT signals) and an accurate control of the output voltage/current (CTRL_V, CTRL_I signals).

In one or more embodiments, the comparators VCMP1, VCMP2 and ICMP1, ICMP2 include comparators operating with hysteresis.

In one or more embodiments, the two comparators VCMP1 and VCMP2 of FIG. 3A are supplied with a supply voltage $V_{DD}$, and arranged for receiving:
 at their non-inverting inputs, a voltage feedback signal from a voltage divider R1, R2 coupled with the signal $V_{OUT}$ (line 20 in FIG. 2);
 at their inverting inputs, the reference signal $V_{REF\_V}$.

In one or more embodiments, the first comparator VCMP1 (which provides the output signal CTRL_V) has a smaller hysteresis than the second comparator VCMP2 (which provides the output signal CTRL_CLAMP).

In one or more embodiments, the two comparators ICMP1 and ICMP2 of FIG. 3B are supplied with the charge-pump supply voltage $V_{CP}$, and arranged for receiving:
 at their non-inverting inputs, the (feedback) signal $V_{ILH}$ related to the output current;
 at their inverting inputs, the reference signal $V_{REF\_I}$.

In one or more embodiments, the first comparator ICMP1 (which provides the output signal CTRL_I) has a smaller hysteresis than the second comparator ICMP2 (which provides the output signal CTRL_SHORT).

In one or more embodiments, the first comparator of the pair (VCMP1 or ICMP1), with smaller hysteresis, controls the feedback signals (e.g. $V_{FB}$ or $V_{ILH}$) around desired values as represented by $V_{REF\_V}$ and $V_{REF\_I}$), respectively.

In one or more embodiments, the second comparator in the pair (VCMP2 or ICMP2), with larger hysteresis, is sensitive to fast and larger variations of the feedback signals.

Figure 4:
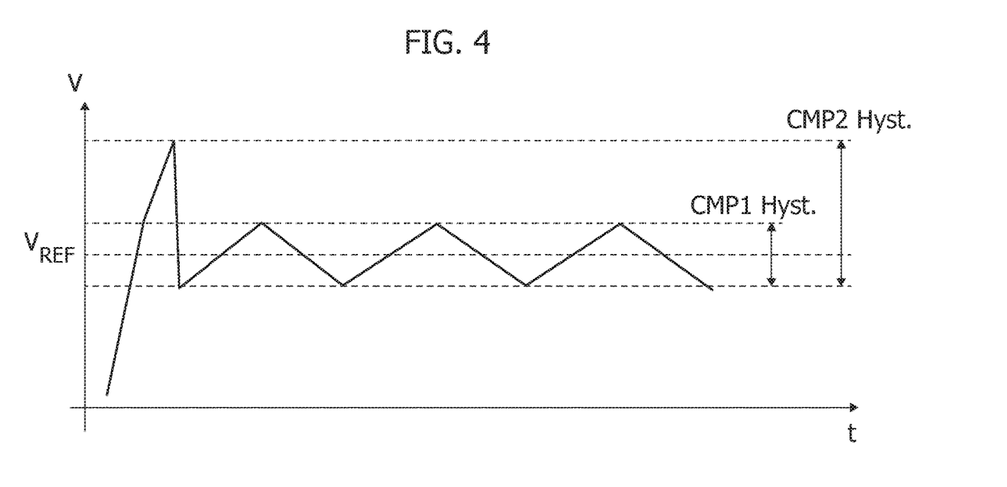
FIG. 4 is a diagram exemplary of possible operation of embodiments.

This behavior is exemplified in the diagram of FIG. 4 over time (abscissa scale t). In FIG. 4 the ordinate V (voltage) may refer to either of $V_{FB}$ and $V_{ILH}$ being compared with a reference $V_{REF}$, namely $V_{REF\_V}$ or $V_{REF\_I}$, respectively.

Similarly, in the diagram of FIG. 4, CMP1 Hyst is exemplary of the possible hysteresis behavior of either VCMP1 or ICMP1, while CMP2 Hyst is exemplary of the possible hysteresis behavior of either VCMP2 or ICMP2.

In one or more embodiments, the digital signals CTRL_CLAMP, CTRL_V, CTRL_SHORT, CTRL_I generated by the sets of comparators 121, 122 are processed to produce the drive signal $V_{GATE}$ (logical switch control) for the power block 18.

Figure 5:
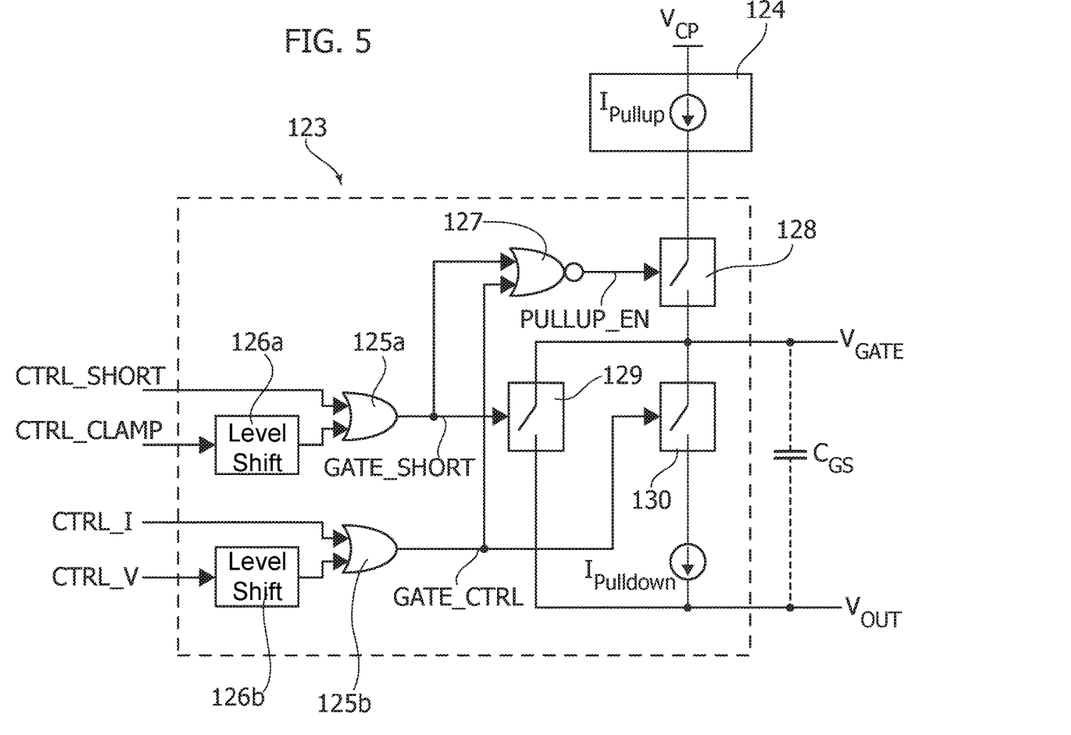
FIG. 5 is a block diagram of a gate driver block which is included in embodiments.

In one or more embodiments, this processing occurs in a gate drive circuit block 123 to which a pullup circuit block 124 may be associated as exemplified in FIG. 5.

In FIG. 5, the references 125a and 125b indicate two OR gates receiving as their inputs:
 the signal CRTL_SHORT (from the comparator set 122) and the signal CRTL_CLAMP (from the comparator set 121), the latter level-shifted in a level shifter 126a;
 the signal CRTL_I (from the comparator set 122) and the signal CRTL_V (from the comparator set 121), the latter level-shifted in a level shifter 126b.

In one or more embodiments, as exemplified in FIG. 5, the OR gates 125a and 125b produce respective outputs GATE_SHORT and GATE_CTRL, respectively.

In one or more embodiments, the outputs GATE_SHORT and GATE_CTRL are fed to the inputs of a further OR gate 127, whose—negated—output PULLUP_EN controls a switch 128 (e.g., an electronic switch such as a MOSFET transistor); the switch 128 selectively couples with the $V_{GATE}$ line (having the parasitic capacitance $C_{GS}$—see also FIG. 2) the output (e.g., a current $I_{Pullup}$) from the pullup block 124.

In one or more embodiments, the output GATE_SHORT controls a switch 129 (e.g., an electronic switch such as a MOSFET transistor) which selectively couples the lines $V_{GATE}$ and $V_{OUT}$ (having the parasitic capacitance $C_{GS}$ coupled across them).

In one or more embodiments, the output GATE_CTRL controls a switch 130 (e.g., an electronic switch such as a MOSFET transistor) which selectively causes a current $I_{Pulldown}$ to flow between the lines $V_{GATE}$ and $V_{OUT}$ from the parasitic capacitance $C_{GS}$. In one or more embodiments, operation of the circuit discussed above is as follows.

When the output signals (CTRL_SHORT, CTRL_CLAMP, CTRL_I, CTRL_V) from the comparators are low, the switch 128 controlled by PULLUP_EN closes and the switches 129, 130 controlled by GATE_SHORT and GATE_CTRL respectively open. As a result, the pull-up current $I_{Pullup}$ flows through the power MOS gate in order to slowly charge the parasitic gate-source capacitance $C_{GS}$. When the output signal (CTRL_SHORT or CTRL_CLAMP) from one of the comparators VCMP2, ICMP2 goes high, the switch 129 controlled by GATE_SHORT closes and the $C_{GS}$ capacitance is discharged rapidly by shorting the gate and source terminals in the power (e.g. MOS transistor) stage 18.

This facilitates a very quick reaction to fast and dangerous condition such as a short-circuit of the output terminal to ground.

The comparators ICMP1 and VCMP1 activate signals CTRL_I and CTRL_V that adequately control the pullup switch 128 and the pulldown switch 130 connected with the two fixed current sources $I_{Pulldown}$ and $I_{Pullup}$. These currents (slightly) charge and discharge the capacitance $C_{GS}$ in order to smoothly control the gate voltage around a target value that depends on the circuit load conditions.

In one or more embodiments, during voltage limitation operation, the voltage signal $V_{OUT}$ may exhibit a ripple (directly) related to the comparator hysteresis, with the output current feedback signal $V_{ILH}$ possibly exhibiting a same behavior in case of current limitation.

Figure 6:
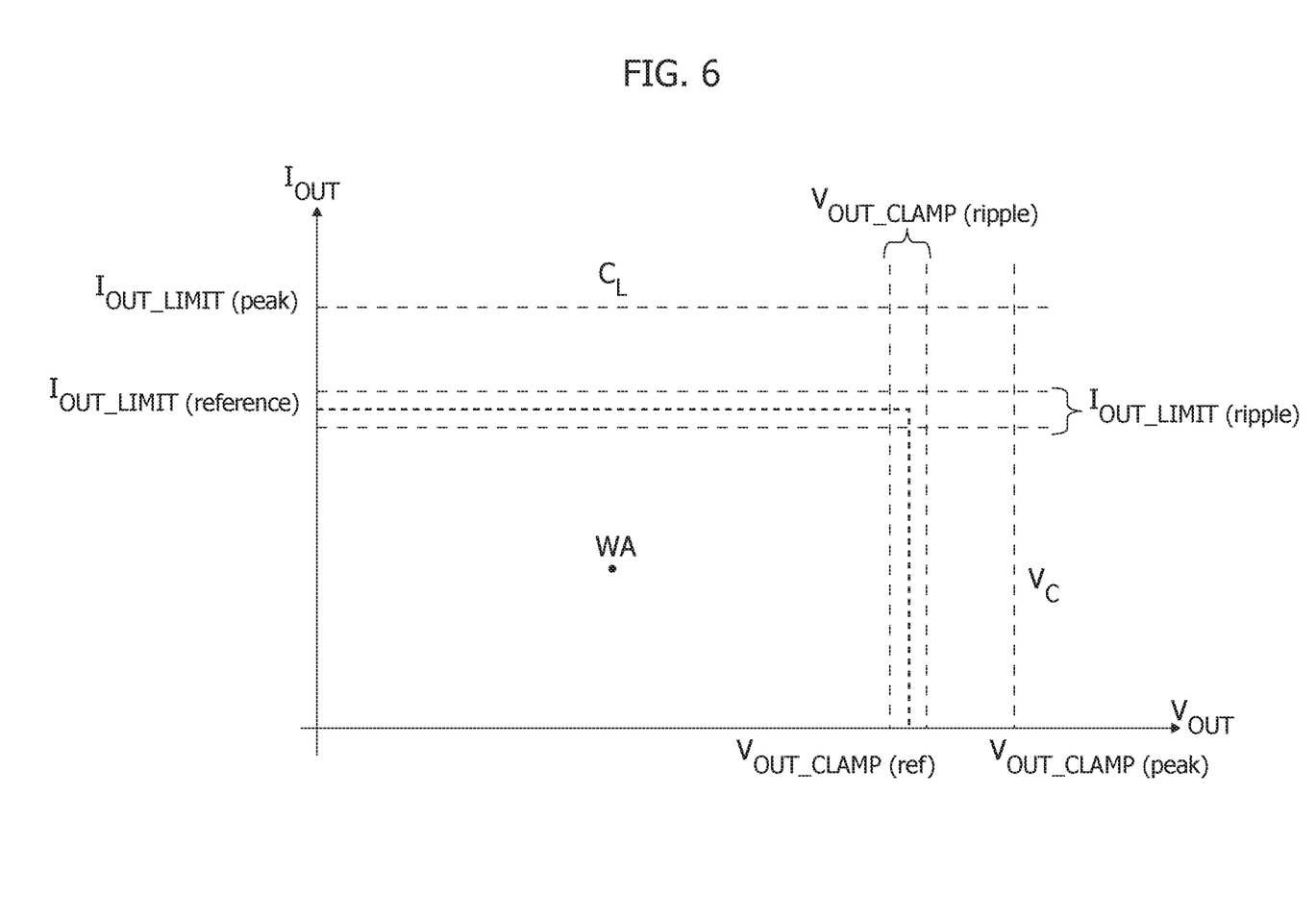
FIG. 6 is a diagram exemplary of possible operation of embodiments.

FIG. 6 is and exemplary diagram, of I/V (current=ordinate; voltage=abscissa) output characteristics of an e-fuse circuit as discussed previously.

In FIG. 6, WA indicates the working area which, in one embodiment, may be bounded:

in terms of voltage, by $V_{OUT\_CLAMP\ (ref)}$ and $V_{OUT\_CLAMP\ (peak)}$ reference and peak values, beyond which voltage clamp operation $V_C$ may set in;

in terms of current, by $I_{OUT\_LIMIT\ (ref)}$ and $I_{OUT\_LIMIT\ (peak)}$ reference and peak values, beyond which current limit operation $C_L$ may set in.

In one or more embodiments, the comparator sets 121 and 122 (FIGS. 3A and 3B) include one comparator each, to a total of two comparators, possibly in combination with two (e.g., small) linear operational amplifiers.

Such embodiments with only two comparators (e.g., VCMP2 and ICMP2, one for voltage feedback control and one for current feedback control) facilitate further area reduction by performing a pure switching control, for example, with the power stage 18 driven ON and OFF by shorting the gate and source terminals, due to the switch 129 between the terminals $V_{GATE}$ and $V_{OUT}$ being closed (that is, made conductive). In that case, output voltage and current ripples may be higher than in the case of those embodiments using four comparators as exemplified in FIGS. 3A and 3B.

As indicated, one or more embodiments adopt a mixed approach involving two comparators (e.g., VCMP2 and ICMP2) in combination with two (small) operational amplifiers, facilitating accurate voltage/current current control around the reference values.

These embodiments are faster than conventional approaches, notionally without ripple on the output voltage/current, with a larger occupation than in those embodiments including four comparators as exemplified previously. Moreover, the "reuse" of the control block may be limited by the redesign of the operational amplifiers.

In one or more embodiments including four comparators as discussed previously, a power MOS transistor gate drive block as exemplified in FIG. 5 includes a switch 130 split into two separate switches that enable gate discharge from two different pulldown current sources in (e.g., with the source $I_{Pulldown}$ correspondingly split into two) with corresponding switches will be actuated by the CTRL_I and CTRL_V signals respectively (and not by the OR-combination thereof as provided at 125*b*). One such embodiment facilitates a more accurate control of the power MOS transistor gate(s) when both current and voltage controls are activated.

One or more embodiments as exemplified herein may be implemented by using BCD technologies.

After being enabled, the circuit undergoes a soft startup ramp-up of the output voltage. When the soft-startup ends, the circuit enters the working condition (WA), with, for example, $V_{OUT}=V_{IN}$.

A voltage clamp condition $V_C$ (see, for example, FIG. 6) is activated, for instance, by $V_{IN}$ varying rapidly from 12V to 18V if a value such as 15V is taken for $V_{OUT\_CLAMP\ (REF)}$.

Similarly a short-circuit current limitation condition $C_L$ (see, for example, FIG. 6) is activated when the $I_{LOAD}$ request overcome the reference $I_{OUT\_LIMIT\ (REF)}$, for example, when the output terminal is shorted towards ground and the output current is limited to the reference $I_{OUT\_LIMIT\ (REF)} \approx 3$ A.

The current limit reference value $I_{OUT\_LIMIT\ (REF)}$ is set by using an external sensing resistance $R_{SENSE}$ (FIG. 2) as possibly selected by the user. As noted, output current ripple may be reduced by resorting to a four comparator control solution.

Once the short circuit removed, the circuit returns to the working condition with a (slow) voltage ramp due to the recharging of the $C_{GS}$ capacitance.

One or more embodiments thus provide an electronic fuse circuit including a controller (12) and a power stage (18) driven by said controller, wherein the controller includes:

a first comparator set (121) and a second comparator set (122) for output voltage ($V_{OUT}$) and output current ($V_{ILH}$) control respectively, wherein each said comparator set includes at least one comparator (VCMP1, ICMP1; VCMP2, ICMP2) said first comparator set and said second comparator set having a reference input ($V_{REF\_V}$, $V_{REF\_I}$), a feedback input ($V_{FB}$, $V_{ILH}$) and at least one output (CTRL_V, CTRL_I; CTRL_CLAMP, CTRL_SHORT), a driver block (123) having output terminals ($V_{GATE}$, $V_{OUT}$) for driving said power stage (18), wherein the driver block includes a switch (129) activatable by said at least one output (CTRL_CLAMP, CTRL_SHORT) from said first comparator set and said second comparator set to clamp the voltage across the output terminals ($V_{GATE}$, $V_{OUT}$) of the driver block as a result of the feedback input to either one (125*a*) of said first comparator set and said second comparator set having exceeded the respective reference input.

In one or more embodiments said first comparator set and said second comparator set include comparators with hysteresis (CMP1 Hyst., CMP2 Hyst.).

One or more embodiments, said power stage has an input capacitance coupled across the output terminals of the driver block, and:
  said first comparator set and said second comparator set include a first comparator in the set (VCMP1, ICMP1) and a second comparator in the set (VCMP2, ICMP2) having a common reference input ($V_{REF\_V}$, $V_{REF\_I}$), a common feedback input ($V_{FB}$, $V_{ILH}$) and distinct outputs (CTRL_V, CTRL_CLAMP; CTRL_I, CTRL_SHORT) with said switch in the driver block activatable by the outputs (CTRL_CLAMP, CTRL_SHORT) from the second comparators (VCMP2, ICMP2) in said first and second comparator sets,
  the driver block includes at least one second switch (130) activatable by the output (CTRL_V, CTRL_I) from the first comparators (VCMP1, ICMP1) in said first and second comparator sets to discharge said capacitance coupled across the output terminals of the driver block as a result of the feedback input to either one (125b) of said first comparator set and said second comparator set having exceeded a respective reference input.

In one or more embodiments said first comparator set and said second comparator set include a first comparator (VCMP1, ICMP1) in the set having a hysteresis which is smaller than the hysteresis of the second comparator (VCMP2, ICMP2) in the set.

In one or more embodiments the driver block includes at pull-up switch (128) activatable as a function of the outputs (CTRL_SHORT, CTRL_CLAMP) from the first comparators and the second comparators (VCMP2, ICMP2) in said first (121) and second comparator sets (121, 122) to charge said capacitance ($C_{GS}$) coupled across the output terminals ($V_{GATE}$, $V_{OUT}$) of the driver block (123).

In one or more embodiments, said at least one second switch (130) in the driver block includes two switch branches distinctly activatable by the outputs (CTRL_V, CTRL_I) from the first comparators (VCMP1, ICMP1) in said first (121) and second comparator sets (121, 122) to discharge said capacitance ($C_{GS}$) coupled across the output terminals of the driver block as a result of the feedback input to either one (125b) of said first comparator set and said second comparator set having exceeded a respective reference input.

In one or more embodiments, a device (10) includes:
  an electronic fuse circuit according to one or more embodiments and at least one of:
  a sense resistor ($R_{SENSE}$) coupled to the output of said power stage, wherein the resistance value of said sense resistor sets a reference value ($I_{OUT\_LIMIT\ (REF)}$) for said second comparator set; and/or
  a soft startup block (16) to provide a soft startup ramp-up of the output voltage from the device.

In one or more embodiments, a method of driving a load ($I_{LOAD}$) via an electronic fuse circuit may include:
  providing an electronic fuse circuit (10) according to one or more embodiments,
  coupling said load to the power stage of said electronic fuse circuit, and
  clamping the voltage across the output terminals of the driver block of said electronic fuse circuit (10) as a result of the feedback input to either one of said first comparator set and said second comparator set (122) having exceeded the respective reference input.

Without prejudice to the underlying principles, the details and the embodiments may vary, even significantly, with respect to what has been disclosed by way of example only in the foregoing, without departing from the extent of protection.

The extent of protection is defined by the annexed claims.

The invention claimed is:

1. An electronic fuse circuit, comprising a controller and a power stage driven by said controller, wherein the controller includes:
  a first comparator set for output voltage control and a second comparator set for output current control, wherein each said comparator set includes at least one comparator, said first comparator set and said second comparator set each having a reference input, a feedback input and at least one output; and
  a driver circuit having output terminals for driving said power stage, wherein the driver circuit includes a switch activatable by said at least one output from said first comparator set and said second comparator set to clamp a voltage across the output terminals of the driver circuit as a result of the feedback input to either one of said first comparator set and said second comparator set having exceeded the respective reference input;
  wherein the switch has a control terminal for receiving the at least one output from the first comparator set and for receiving the at least one output from the second comparator set.

2. The electronic fuse circuit of claim 1, wherein said first comparator set and said second comparator set each include comparators with hysteresis.

3. The electronic fuse circuit of claim 1, wherein said power stage has an input capacitance coupled across the output terminals of the driver circuit, and
  wherein said first comparator set and said second comparator set each include a first comparator and a second comparator having a common reference input, a common feedback input and distinct outputs with said switch in the driver circuit being activatable in response to outputs from the second comparators in said first and second comparator sets; and
  wherein the driver circuit includes at least one second switch activatable by the output from the first comparators in said first and second comparator sets to discharge a capacitance coupled across the output terminals of the driver circuit as a result of the feedback input.

4. The electronic fuse circuit of claim 3, wherein the first comparator of said first comparator set and said second comparator set has a hysteresis which is smaller than a hysteresis of the second comparator of said first comparator set and said second comparator set.

5. The electronic fuse circuit of claim 3, wherein the driver circuit includes a pull-up switch activatable as a function of the outputs from the first comparators and the second comparators in said first and second comparator sets to charge said capacitance coupled across the output terminals of the driver circuit.

6. The electronic fuse circuit of claim 3, wherein said at least one second switch in the driver circuit includes two switch branches distinctly activatable by the outputs from the first comparators in said first and second comparator sets to discharge said capacitance coupled across the output terminals of the driver circuit as a result of the feedback input.

7. The electronic fuse circuit of claim 1, further comprising:
a sense resistor coupled to the output of said power stage, wherein a resistance value of said sense resistor sets a reference value for said second comparator set.

8. The electronic fuse circuit of claim 1, further comprising:
a soft startup circuit configured to provide a soft startup ramp-up of an output voltage across the output terminals.

9. An electronic fuse circuit, comprising a controller and a power stage having a gate terminal driven by said controller, wherein the controller includes:
a switch circuit configured to discharge a gate capacitance at said gate terminal;
a first comparison circuit configured to compare a sensed output current of the power stage to a first reference with a first hysteresis and generate a first control signal that is asserted if the first reference is exceeded; and
a second comparison circuit configured to compare a sensed output voltage of the power stage to a second reference with a second hysteresis and generate a second control signal that is asserted if the second reference is exceeded;
wherein said switch circuit is actuated in response to assertion of either the first control signal or the second control signal;
wherein the switch has a control terminal for receiving the first control signal from the first comparison circuit and for receiving the second control signal from the second comparison circuit.

10. The electronic fuse circuit of claim 9, further comprising:
a current sink circuit configured to sink current from said gate terminal;
a third comparison circuit configured to compare the sensed output current of the power stage to the first reference with a third hysteresis and generate a third control signal that is asserted if the first reference is exceeded; and
a fourth comparison circuit configured to compare the sensed output voltage of the power stage to the second reference with a fourth hysteresis and generate a fourth control signal that is asserted if the second reference is exceeded;
wherein the current sink circuit is actuated in response to assertion of either the third control signal or the fourth control signal.

11. The electronic fuse circuit of claim 10, further comprising:
a current source circuit configured to source current to said gate terminal;
wherein the current source circuit is actuated when none of the first, second, third and fourth control signals are asserted.

12. The electronic fuse circuit of claim 10, wherein a range of the first hysteresis is larger than a range of the third hysteresis and wherein a range of the second hysteresis is larger than a range of the fourth hysteresis.

13. The electronic fuse circuit of claim 12, wherein a lower value of the ranges of the first hysteresis and the third hysteresis is the same and wherein a lower value of the ranges of the second hysteresis and the fourth hysteresis is the same.

14. An electronic fuse circuit, comprising a controller and a power stage driven by said controller, wherein the controller includes:
a first comparator set for output voltage control and a second comparator set for output current control, wherein each said comparator set includes at least one comparator, said first comparator set and said second comparator set each having a reference input, a feedback input and at least one output; and
a driver circuit having output terminals for driving said power stage, wherein the driver circuit includes a switch activatable by said at least one output from said first comparator set and said second comparator set to clamp a voltage across the output terminals of the driver circuit as a result of the feedback input to either one of said first comparator set and said second comparator set having exceeded the respective reference input;
wherein the power stage comprises at least one power transistor;
wherein the output terminals of the driver circuit comprise a power transistor control terminal output and a power transistor conduction terminal output; and
wherein the switch clamps the voltage across the power transistor control terminal output and power transistor conduction terminal output.

15. The electronic fuse circuit of claim 14, wherein said first comparator set and said second comparator set each include comparators with hysteresis.

16. The electronic fuse circuit of claim 14, wherein said power stage has an input capacitance coupled across the output terminals of the driver circuit, and
wherein said first comparator set and said second comparator set each include a first comparator and a second comparator having a common reference input, a common feedback input and distinct outputs with said switch in the driver circuit being activatable in response to outputs from the second comparators in said first and second comparator sets; and
wherein the driver circuit includes at least one second switch activatable by the output from the first comparators in said first and second comparator sets to discharge a capacitance coupled across the output terminals of the driver circuit as a result of the feedback input.

17. The electronic fuse circuit of claim 16, wherein the first comparator of said first comparator set and said second comparator set has a hysteresis which is smaller than a hysteresis of the second comparator of said first comparator set and said second comparator set.

18. The electronic fuse circuit of claim 16, wherein the driver circuit includes a pull-up switch activatable as a function of the outputs from the first comparators and the second comparators in said first and second comparator sets to charge said capacitance coupled across the output terminals of the driver circuit.

19. The electronic fuse circuit of claim 16, wherein said at least one second switch in the driver circuit includes two switch branches distinctly activatable by the outputs from the first comparators in said first and second comparator sets to discharge said capacitance coupled across the output terminals of the driver circuit as a result of the feedback input.

* * * * *